*George W. Hubbard — Improvement in Shaft Couplings.*
73,100
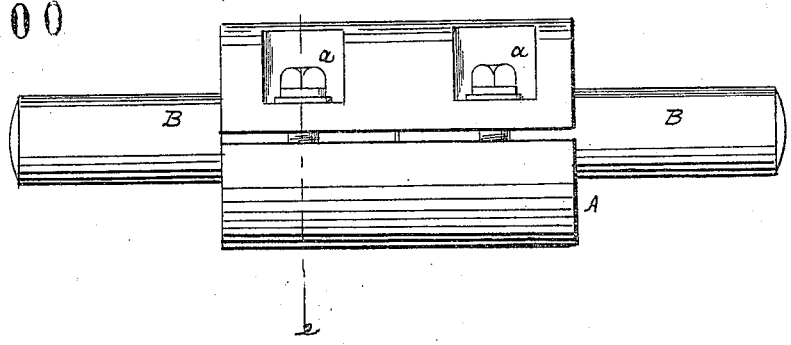
PATENTED
JAN 7 1868
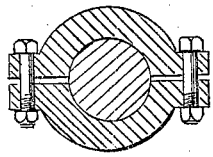
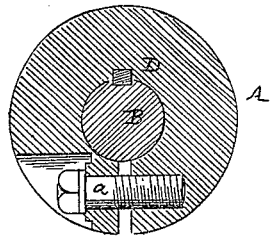
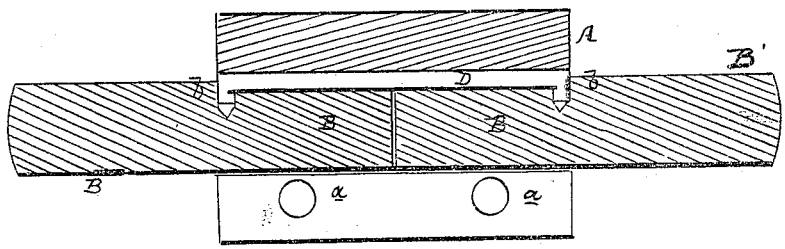
Witnesses:
Wm Albert Steel
S. K. _____
G. W. Hubbard
By his Atty

UNITED STATES PATENT OFFICE.

GEORGE W. HUBBARD, OF PHILADELPHIA, PENNSYLVANIA, ASSIGNOR TO CRESSON & SMITH, OF SAME PLACE.

IMPROVEMENT IN SHAFT-COUPLING.

Specification forming part of Letters Patent No. 73,100, dated January 7, 1868.

*To all whom it may concern:*

Be it known that I, GEORGE W. HUBBARD, of Philadelphia, Pennsylvania, have invented an Improvement in Shaft-Couplings; and I do hereby declare the following to be a full, clear, and exact description of the same.

My invention relates exclusively to that class of couplings which are arranged to clamp and embrace the ends of two adjacent shafts with a gripe which may be tightened at pleasure by bolts or screws, and thereby retain the shafts in their proper position longitudinally; and my invention consists in the combination, described hereafter, of such a coupling with a safety-key and the shafts, so that the said key shall perform the provisional duty of preventing the shafts from parting should the bolts or screws be broken or become loose.

In order to enable others skilled in the art to make and use my invention, I will now proceed to describe the mode of carrying the same into effect, reference being had to the accompanying drawing, which forms a part of this specification, and in which—

Figure 1 represents the ends of two adjacent shafts secured by a clamp-coupling; Fig. 2, a transverse section on the line 1 2, Fig. 1; Fig. 3, a longitudinal section of the coupling-shafts and safety-key, and Fig. 4 a modified form of clamp-coupling to which my invention is applicable.

It should be understood in the outset that my invention is connected with what may be termed "clamping-couplings," on the tight gripe of which on the shafts mainly depends the securing of the same together, and has no connection with sleeve or plate couplings, which are driven onto the shafts.

A represents a clamp-coupling, consisting of a strong and heavy tube of cast-iron, severed longitudinally at one point, and furnished with set-screws $a$, on tightening which the coupling is contracted and made to embrace the two ends of the shafts B and B' with so tight a gripe that one cannot move longitudinally without the other unless one or both of the set-screws $a$ become loose. A key, D, extending from end to end of the coupling, is embedded partly in a groove in the latter and partly in grooves in the shafts, so as to assist the griping-coupling in preventing one shaft from turning without the other.

The main object of the key, however, is a provisional one—namely, that of preventing accidents should one or both of the set-screws $a$ break or become loose. In order that the key may effectually perform this provisional duty, and act as a safety appliance under such circumstances, each end is provided with a projection, $b$, one fitting easily in a corresponding recess in one shaft, and the other as easily in a corresponding recess in the other shaft, as shown in Fig. 3.

As long as the screws $a$ remain tight and whole, the coupling itself, by its forcible gripe, prevents the shafts from parting longitudinally without the aid of the key; but should one of the screws be broken or become loose, so as to permit the coupling to expand and lose its gripe of one of the shafts, the longitudinal movement of the latter is prevented by the key, and the unusual noise caused by the yielding of the coupling serves to indicate to the attendant that prompt repairing of the loose or fractured screw is necessary, for it is not intended that the key should continue to perform this duty, but to serve as a check and safety-indicator of the imperfection of the coupling, so that the latter may be restored to its normal condition and perform its duty as regards the resisting of the independent longitudinal movement of the two shafts without the uncertain aid of the key, after which the latter becomes a quiescent safeguard against future accidents to the coupling.

It will be evident that my invention is applicable to clamp-coupling composed of two parts secured together by bolts or set-screws, as seen in Fig. 4.

I wish it to be understood that I do not desire to claim, broadly and separately, any of the parts illustrated and described, as clamp-couplings are old and well known, and as keys similar to that described have been used in connection with solid sleeve-couplings, in which case, however, they perform the permanent duty of preventing the parting of the two shafts, the sleeve-coupling of itself being insufficient to perform this duty effectually.

I therefore limit my claim to, and desire to obtain Letters Patent for—

The combination of a clamp or griping coupling, A, constructed substantially as described, and provisional safety-key D, with the shafts B and B', as and for the purpose set forth.

In testimony whereof I have signed my name to this specification in the presence of two subscribing witnesses.

GEO. W. HUBBARD.

Witnesses:
ALFRED B. OSWELL,
E. OSCAR HAMPTNER.